United States Patent [19]

Inoue et al.

[11] Patent Number: 5,418,357
[45] Date of Patent: May 23, 1995

[54] BAR-CODE READER PERMITTING SELECTIVE USE OF A WHOLE OR A PART OF AN IMAGE SENSOR

[75] Inventors: Katsushi Inoue, Kyoto; Seiichiro Tamai, Osaka; Keiichi Kobayashi, Higashiosaka; Marie Dosho, Katano, all of Japan

[73] Assignee: Matsushita Electric Industrial Co., Ltd., Osaka, Japan

[21] Appl. No.: 76,960

[22] Filed: Jun. 16, 1993

[30] Foreign Application Priority Data

Jun. 22, 1992 [JP] Japan .................................. 4-161542

[51] Int. Cl.⁶ .................................................. G06K 7/10
[52] U.S. Cl. ..................................... 235/472; 235/462; 235/470
[58] Field of Search ............... 235/462, 463, 467, 470, 235/472, 440, 455, 436, 439, 435; 382/59; 250/208.1, 208.4

[56] References Cited

U.S. PATENT DOCUMENTS

| | | | |
|---|---|---|---|
| 3,770,942 | 11/1973 | McMurtry | 235/462 |
| 4,472,710 | 9/1984 | Suzuki et al. | 235/472 |
| 4,818,886 | 4/1989 | Drucker | 235/462 X |
| 4,900,907 | 2/1990 | Matsusima et al. | 235/462 |
| 4,963,756 | 10/1990 | Quan et al. | 235/472 X |
| 5,023,922 | 6/1991 | Abramovitz et al. | 382/59 |
| 5,140,148 | 8/1992 | Kitamura et al. | 250/208.1 |
| 5,235,167 | 8/1993 | Dvorkis et al. | 235/467 |
| 5,258,605 | 11/1993 | Metlitsky et al. | 235/470 |
| 5,319,182 | 6/1994 | Havens et al. | 235/440 |

FOREIGN PATENT DOCUMENTS

| | | |
|---|---|---|
| 0238067 | 9/1987 | European Pat. Off. |
| 0384955 | 9/1990 | European Pat. Off. |
| 0488202 | 6/1992 | European Pat. Off. |
| 0027377 | 2/1984 | Japan ......................... 235/462 |
| 0269263 | 11/1988 | Japan ......................... 235/467 |
| 2264383 | 10/1990 | Japan . |

OTHER PUBLICATIONS

Patent Abstracts of Japan; vol. 012, No. 264 (P-734) 23 Jul. 1988 & JP-A-63 047 893 (Toshiba Corp) 29 Feb. 1988.

*Primary Examiner*—Donald Hajec
*Assistant Examiner*—Karl D. Frech
*Attorney, Agent, or Firm*—Stevens, Davis, Miller & Mosher

[57] ABSTRACT

A bar-code reader includes a selection circuit which selects one of two operating modes of reading a bar code label by using the whole section or partial section of an image sensor.

2 Claims, 3 Drawing Sheets

BAR-CODE READER PERMITTING SELECTIVE USE OF A WHOLE OR A PART OF AN IMAGE SENSOR

CROSS-REFERENCE TO RELATED APPLICATION

This application is a related application to a U.S. application which was filed on 1993 as Ser. No. 08/077,096 and entitled BAR-CODE READER DEVICE, the priority of which is based on Japanese patent application 4-161543 filed on Jun. 22, 1992.

BACKGROUND OF THE INVENTION

This invention relates to a bar-code reader use in the EPOS system and the like.

Bar code symbolic systems are categorized as the JAN code, EAN code and UPC code systems, each composed of a fixed number of stripes and intended for retail commodities, and the Code39, Code128, NW7 code and ITF code systems, each composed of an unfixed number of stripes and intended for the FA, wholesale and OA industries. In addition, there are two-dimensional bar code systems including a multi-stage bar code system which is composed of the above-mentioned various code symbols arrayed in multiple stages, and the Code49 system which is composed of sets of a fixed number of stripes arrayed in a number of stages ranging from two to eight.

As a means of reading bar code symbols of a fixed number of stripes, bar-code readers based on the image sensor have been used more prevalently as compared with pen-type bar-code readers. Bar code price labels are attached to a variety of retail commodities, such as canned goods and cloth products, which do not necessarily have hard and flat surfaces. Therefore, cashiers often prefer the bar-code reader based on the image sensor which bases the operation on electronic scanning across a bar code through its reading window having a focal depth of 10 mm or more by being kept stationary on the label, rather than the pen-type bar-code reader which needs to trace a bar code at a constant speed by being in contact with the label.

On the other hand, bar code symbols with unfixed numbers of stripes can extend as long as 15 to 20 cm, and are printed directly or labeled on hard and flat surfaces. Therefore, the pen-type bar-code reader is often used, rather than the image sensor based bar-code reader which suffers the bulkiness and poor operability and accuracy in dealing with long bar code labels.

As a result of recent development of bar code applications, bar code symbols based on the JAN, EAN and UPC code systems labeled on such soft surfaces as cloth products and bar code symbols of unfixed lengths based on the Code39, Code128, NW7 and ITF code systems appear mixed in the retail, FA, OA and wholesale industries. Consequently, bar code users have to prepare two kinds of bar-code readers, i.e., pen type and image sensor type, attain the connectivity of two kinds of readers to a host machine, and select one of the devices depending on the kind of bar code. These problems are considerable barriers against the progress of bar code applications.

SUMMARY OF THE INVENTION

This invention is intended to solve the foregoing prior art problems, and its prime object is to provide a bar-code reader capable of reading bar code symbols of various types having arbitrary code lengths.

In order to achieve the above objective, the bar-code reader based on this invention comprises a light emission means for projecting a light beam onto a bar code label, a light reception means for focusing the reflected light beam from the label on an image sensor, a signal processing means for processing the output signal of the image sensor, and a decoding means for decoding the bar code symbol based on the output of the processing means.

The bar-code reader is designed to operate in a mode of reading a bar code label with the whole section of image sensor and another mode of the reading a bar code label with a partial section of the sensor, with these operating modes being selected with a mode selection means, so that the reader is adaptive to various bar code symbols having arbitrary code lengths. The operating mode which determines the use of the whole or partial section of the image sensor is switched by means of a switch device or in response to an external signal from the host machine conducted depending on the kind of bar code, or in response to an internal signal produced by the reader itself based on the automatic discrimination of the bar code.

DESCRIPTION OF THE PREFERRED EMBODIMENT

An embodiment of this invention will be described with reference to the drawings.

Figure 1:
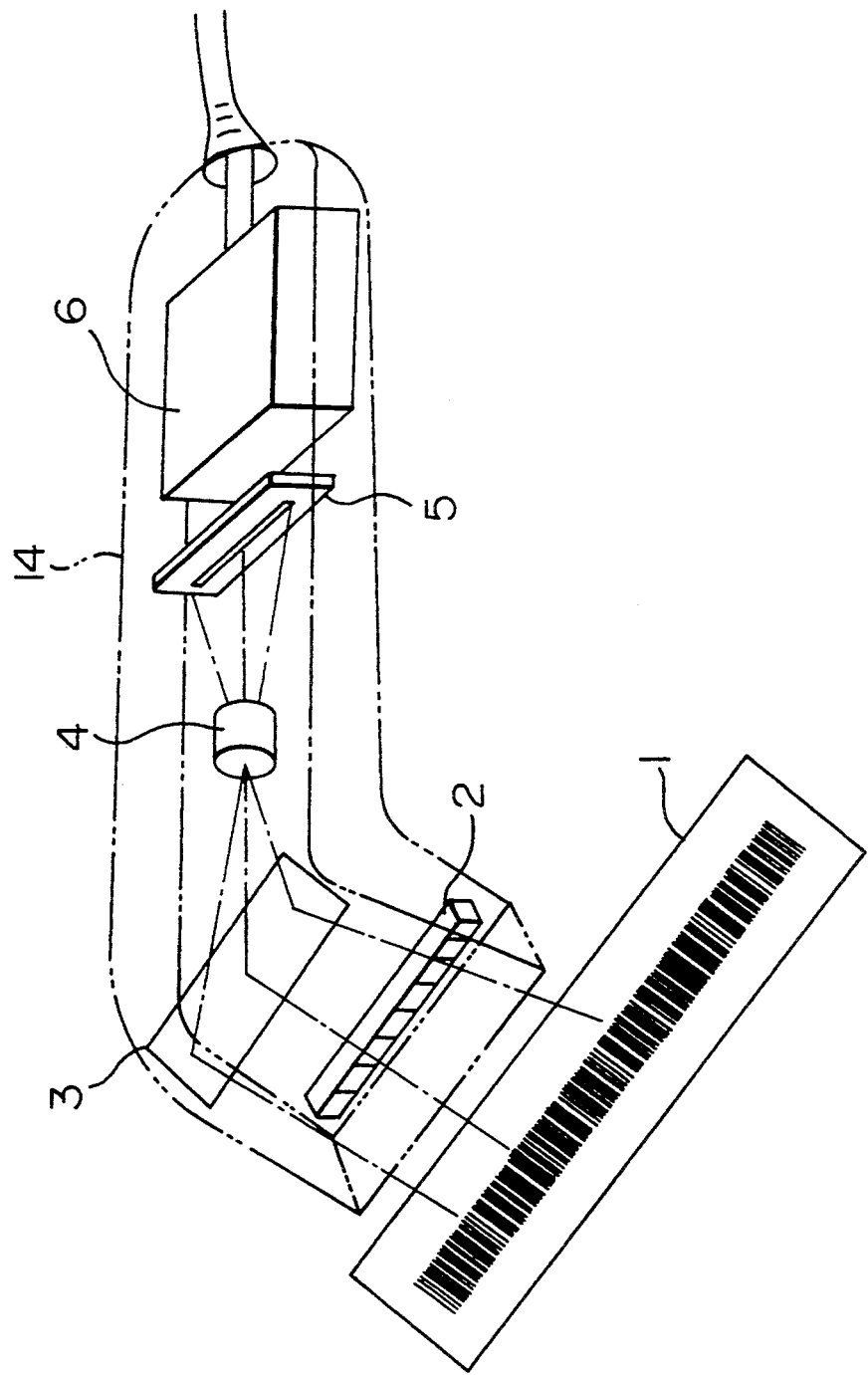
FIG. 1 is a perspective diagram showing the internal structure of the bar-code reader based on an embodiment of this invention.

FIG. 1 shows the structure of the bar-code reader based on this embodiment. In the figure, the bar-code reader 14 includes a light emitter 2 which projects a light beam onto a one-dimensional bar code symbol printed on a label 1. The reflected light from the label 1 is conducted by way of a mirror 3 and lens 4 to a linear image sensor 5, which is connected electrically to a circuit section 6.

The light emitter 2 consists of an alignment of multiple LEDs having a 660 nm wavelength. The linear image sensor 5 is formed of a CCD (charge coupled device) linear image sensor of 3648 pixels, and it. functions to convert a bar code image focused by the lens 4 into an electrical signal. The circuit section 6 includes a waveform processing circuit and a microprocessor with internal 64-kilobyte ROM and 2-kilobyte RAM which implements decoding of the bar code.

The image sensor may otherwise be a device based on the CID (charge injection device) or other opto-electric transducing device. Sensor elements may be of the linear arrangement adopted for a linear image sensor, or may be of the planar arrangement adopted for an area image sensor.

Bar code symbols which can be read by this bar-code reader include one-dimensional bar code symbols, two-dimensional bar code symbols, multi-stage bar code symbols, and combinations of these symbols.

Figure 2:
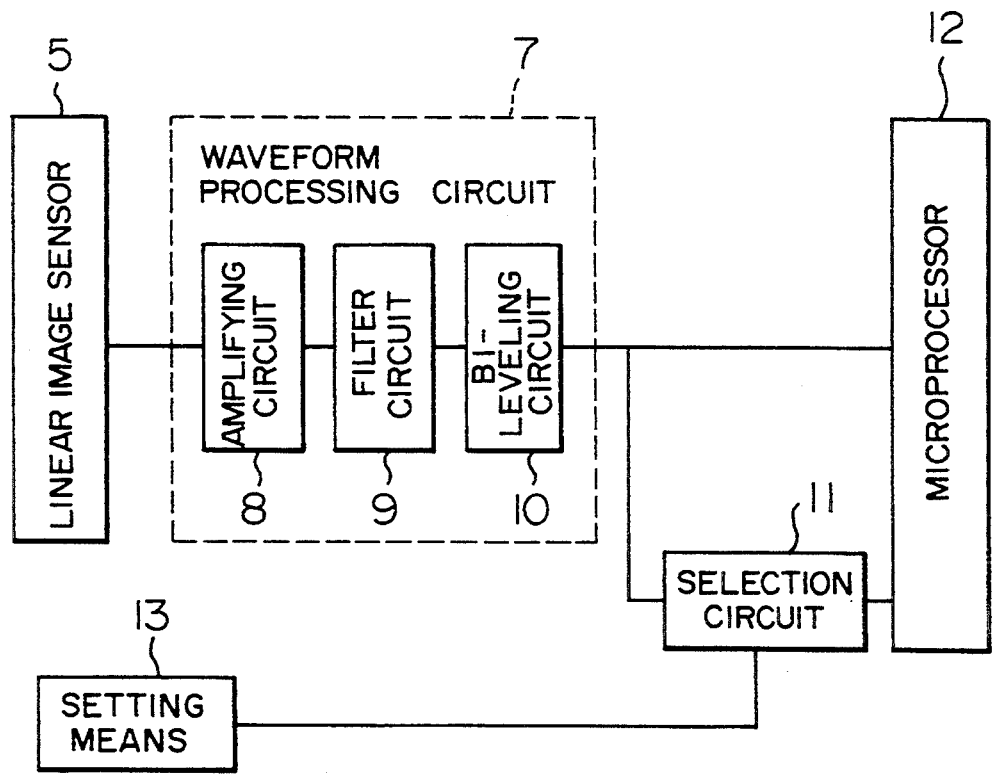
FIG. 2 is a block diagram of the circuit section of the bar-code reader shown in FIG. 1.

FIG. 2 shows the arrangement of the circuit section 6. Indicated by 7 is a waveform processing circuit which amplifies the signal from the linear image sensor 5 and converts the analog signal into a two-level digital signal. The circuit 7 consists of an amplifying circuit 8, a filter circuit 9 and a bi-leveling circuit 10 all formed of operational amplifiers or the like. Indicated by 11 is a selection circuit based on a counter, and it determines the use of the whole or partial section of the image sensor for reading a bar code depending on the count value. The selection circuit 11 is operated by a setting means 13 which is a switch device attached on the case of the reader, or in response to the selection command issued automatically by a microprocessor 12 which implements the processings of bar code analysis and communication with the host machine.

Other electrical components such as LEDs and a buzzer which notifies the completion of bar code reading and their associated control circuits are not shown in FIG. 2.

Although in this embodiment the selection of operating mode is based on the counter in the selection circuit 11 as an example of design, it can otherwise be performed by the microprocessor 12 in response to signals derived from specific portions of the image sensor through the process by the waveform processing circuit 7.

Figure 3A:
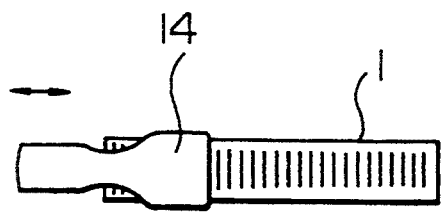
FIGS. 3A and 3B are diagrams showing the manners of reading long bar code symbols with the bar-code reader shown in FIG. 1.
Figure 3B:
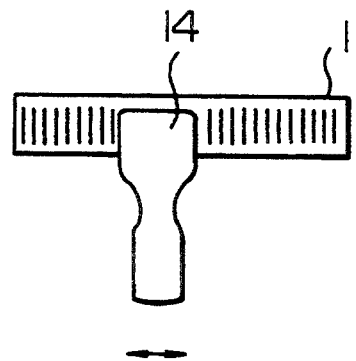

FIGS. 3A and 3B show the manners of reading bar code symbols having a code length greater than the width of reading window of the bar-code reader 14. Shown in FIG. 3A is the case of the mode of using part of the image sensor set by the switch or by the signal from the host machine, and the bar-code reader 14 is moved in the direction as shown to scan the bar code symbol on the label 1. Another bar code scanning operation is as shown in FIG. 3B, in which case the length of the bar code relative to the width of the reading window of the bar-code reader 14 is judged from the proportion of the bar code image in the field of image sensor, and the operating mode can be set automatically based on the result of judgement.

Figure 4A:
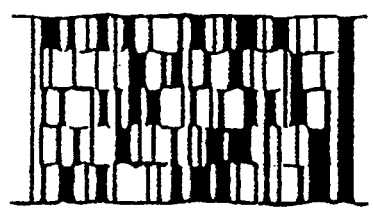
FIGS. 4A and 4B are two views of a Code49 bar code.
Figure 4B:
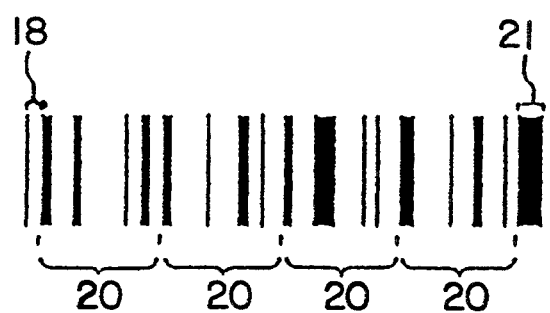

FIGS. 4A and 4B show the Code49 bar code as mentioned above, which is an example of a two-dimensional bar code. FIG. 4A shows an entire Code49 bar code, which has sets of stripes arranged in a number of stages. FIG. 4B shows one stage of the bar code shown in FIG. 4A. In accordance with the Code49 system, each stage includes a start pattern 18 indicating the beginning of the stage, a stop pattern 21 indicating the end of the stage, and symbolic characters 20 formed by sets of stripes.

According to this invention, as described above for its specific embodiment, this single bar-code reader is operative in two modes of using the whole or partial section of the image sensor selectively to match each bar code symbol which can be a bar code consisting of a large number of stripes that is too long for the usual bar-code reader based the on image sensor to deal with, or can be a bar code labeled on a cloth product or canned goods that is too unstable for the usual pen-type bar-code reader to deal with, whereby it contributes significantly to the industry in terms of the enhanced operability and cost efficiency.

We claim:

1. A bar-code reader comprising:
   an image sensor for producing an output signal in response to light incident on said image sensor, said image sensor operating selectively in one of a first operating mode in which a whole of said image sensor produces said output signal and a second operating mode in which a portion of said image sensor less than said whole image sensor produces said output signal;
   light emission means for projecting a light beam onto a bar code label, the bar code label having thereon a bar code symbol;
   light reception means for focusing a portion of the light beam which is reflected from the bar code label onto the image sensor;
   signal processing means for processing the output signal which is output by said image sensor in response to the portion of the light beam which is focused onto the image sensor by the light reception means and for generating a processed output;
   decoding means for decoding the bar code symbol on the bar code label based on the processed output of said signal processing means; and
   selection means for selecting said first operating mode or said second operating mode as an operating mode in reading the bar code label, wherein said decoding means functions to decode multi-stage bar code symbols in addition to one-dimensional bar code symbols and two-dimensional bar code symbols.

2. A bar-code reader comprising:
   an image sensor for producing an output signal in response to light incident on said image sensor, said image sensor operating selectively in one of a first operating mode in which a whole of said image sensor produces said output signal and a second operating mode in which a portion of said image sensor less than said whole image sensor produces said output signal;
   light emission means for projecting a light beam onto a bar code label, the bar code label having thereon a bar code symbol;
   light reception means for focusing a portion of the light beam which is reflected from the bar code label onto the image sensor;
   signal processing means for processing the output signal which is output by said image sensor in response to the portion of the light beam which is focused onto the image sensor by the light reception means and for generating a processed output;
   decoding means for decoding the bar code symbol on the bar code label based on the processed output of said signal processing means; and
   selection means for selecting said first operating mode or said second operating mode as an operating mode in reading the bar code label, wherein said decoding means comprises means for determining a proportion of the bar code symbol within a field of view of the image sensor and controlling said selection means to select said operating mode in accordance with said proportion.

* * * * *